May 27, 1930.  A. PILNY  1,759,914
METHOD OF PRODUCING FILMS FOR COLOR CINEMATOGRAPHY
Filed Nov. 5, 1928
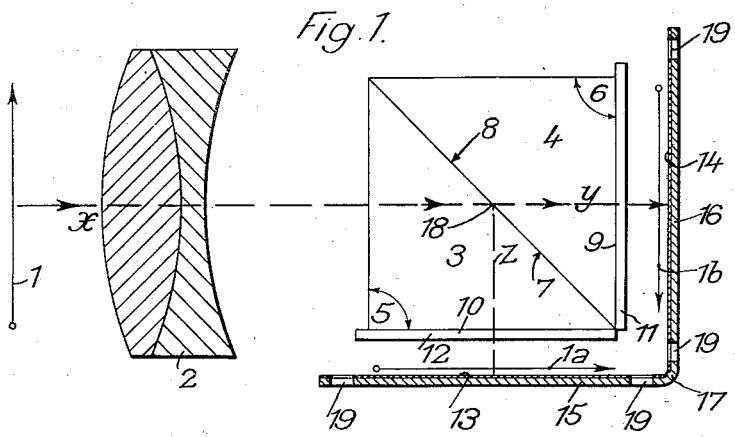
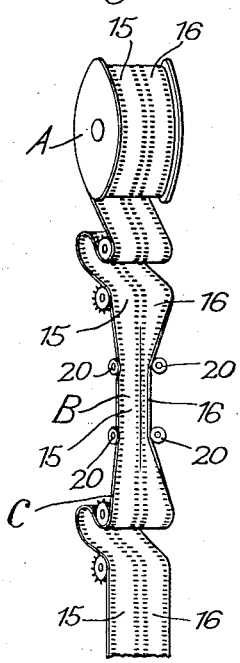
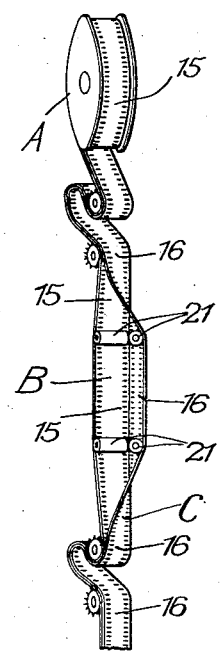
Inventor.
Alexander Pilny.

Patented May 27, 1930

1,759,914

UNITED STATES PATENT OFFICE

ALEXANDER PILNY, OF ZURICH, SWITZERLAND

METHOD OF PRODUCING FILMS FOR COLOR CINEMATOGRAPHY

Application filed November 5, 1928, Serial No. 317,262, and in Germany November 8, 1927.

In color cinematography films are required presenting an image obtained by splitting up an original image into individual images, colouring the latter differently and uniting them again. It has already been proposed to produce such films by splitting up an image into two partial images which are projected on two individual films placed at right angles to each other.

This method requires a complicated camera with special register devices for both films, the latter are very rarely developed in the same degree and do not have exactly the same shrinkage. In order to obviate these disadvantages and at the same time to simplify the method with the present method two parts arranged at right angles of one film folded longitudinally are provided with these partial pictures.

The accompanying drawing serves for explaining by way of example the present method. In the drawing:

Fig. 1 shows in a diagrammatic manner an arrangement for carrying into effect the method, Fig. 2 shows one constructional example of the film, Fig. 3 shows a second constructional example of the film.

In Fig. 1 the original image is designated with 1 and 2 is an objective of any type. 3, 4 denote a known combination of two prisms of the same type, i. e. two triangular prisms 3 and 4 placed against each other with their faces 7 and 8 which are opposite to the right angles 5 and 6. Adjacent to the faces 9 and 10 standing at right angles to each other are color filters 11 and 12, for instance a green and a red filter.

Parallel to the faces 10 and 9 are the emulsion coatings 13 and 14 of a single double width film folded at 17 longitudinally to form two parts 15 and 16 arranged at right angles to each other.

With this arrangement the bundle of rays of the single image 1 is split up in a known manner at the point 18 into the bundles of rays $y$ and $z$, and the two appertaining partial pictures $1^a$ and $1^b$ are simultaneously produced on a single film 15, 16.

The partial pictures $1^a$ and $1^b$ may thus be produced in the normal size on a film having double the normal width. This film is provided with perforations 19 previous to the exposure. With the rectangular folding of the film 15, 16 the emulsion coating is preferably adjacent to the combination of prisms 3, 4. However, this is not necessary and they could be provided on the outer side and be exposed through the carrier layer of the film.

With the manner of guiding the double width film illustrated in Fig. 2 the film 15, 16 is wound on the unwinding roller A so that the two parts 13 and 14 of the emulsion coating are aside each other. By any suitable means, for instance guide wedges, rollers 20 the film is so folded over the length B that the parts 15 and 16 are at right angles to each other. Along the length B the exposure as indicated in Fig. 1 occurs; along the length C the film is again unfolded.

In the guiding of the film shown in Fig. 3 the film is wound on the roller A in folded condition and is unfolded so far on the length B by the angular guide 21 that the parts are at right angles to each other. On the length C the longitudinal folding of the film is again effected so that it can be wound up again in the folded condition.

The partial pictures produced according to this method are in every case symmetrically arranged to each other and the folded film permits a simple producing of the positive color film, by placing a known double film, i. e. a film having emulsion coatings on both sides of the carrier and a coloured layer impervious to light arranged between these coatings, between the parts of the folded film and exposing from both sides.

I claim:

1. A method of producing film strips for cinematography which comprises splitting a series of images rectangularly and projecting them onto longitudinal parallel portions of a film strip by folding the strip longitudinally at right angles to present said portions for receiving the partial images.

2. A method of producing film strips for cinematography which comprises splitting a series of images rectangularly and projecting them onto longitudinal parallel portions of a film strip by folding the strip longitudinally at right angles at the point of exposure thereof, to present said portions for receiving the partial images.

3. A method of producing film strips for cinematography which comprises splitting the images of a series of images into partial images at an angle to one another, exposing a sensitized film strip to the partial images simultaneously by longitudinally folding the strip to receive the images.

4. A method of producing film strips for cinematography which comprises splitting a series of images into partial images at an angle to one another, and projecting them onto a sensitized film strip longitudially folded upon itself by unfolding the longitudinal portions of the strip to receive the partial images.

5. A method of producing film strips for cinematography which comprises splitting a series of images into partial images at an angle to one another and projecting them onto a sensitized film strip longitudinally folded upon itself by unfolding the strip at an angle at the point of exposure to receive the partial images.

6. A method of producing film strips for cinematography which comprises folding a sensitized film strip upon itself longitudinally, splitting a series of images rectangularly and positioning the longitudinal portions of the strip substantially at right angles to one another at the point of exposure to receive pairs of partial images simultaneously.

7. A method of producing film strips for cinematography which comprises folding a sensitized film strip longitudinally with the sensitized face of one longitudinal portion parallel to the sensitized face of the other longitudinal portion splitting a series of images into partial images at an angle to one another and unfolding the longitudinal portions at an angle to one another substantially at the point of exposure to receive said partial images.

In testimony whereof I have signed my name to this specification.

ALEXANDER PILNY.